P. MALCAMP.
AUTOMATIC ALARM MECHANISM FOR PASTEURIZING MILK.
APPLICATION FILED JAN. 9, 1922.
1,421,517.
Patented July 4, 1922.
2 SHEETS—SHEET 2.
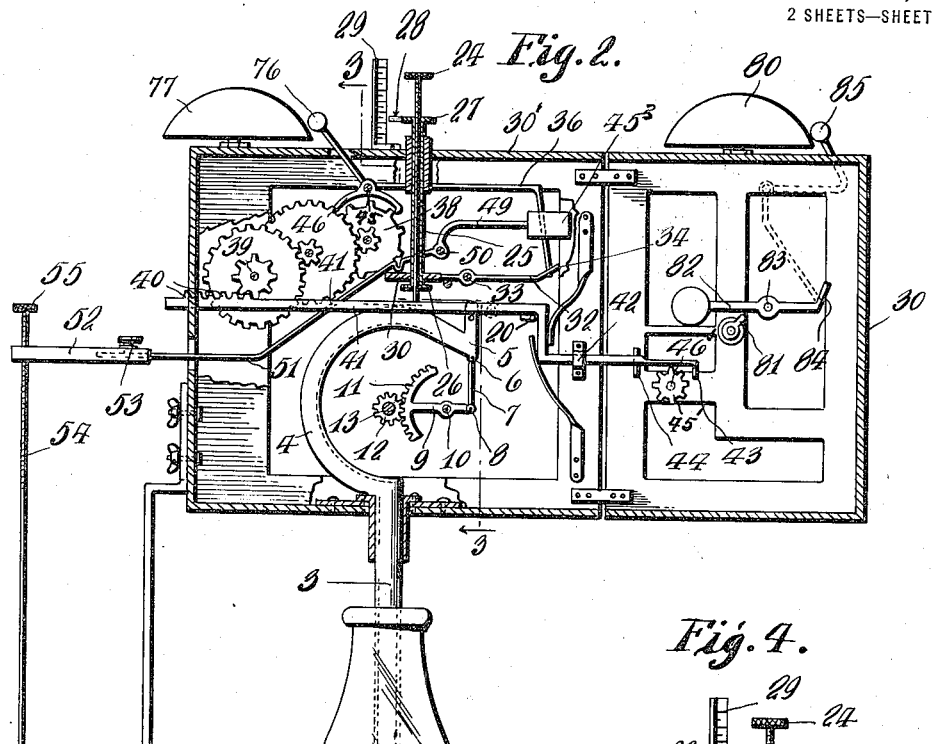
Inventor
P. Malcamp by
Attorney

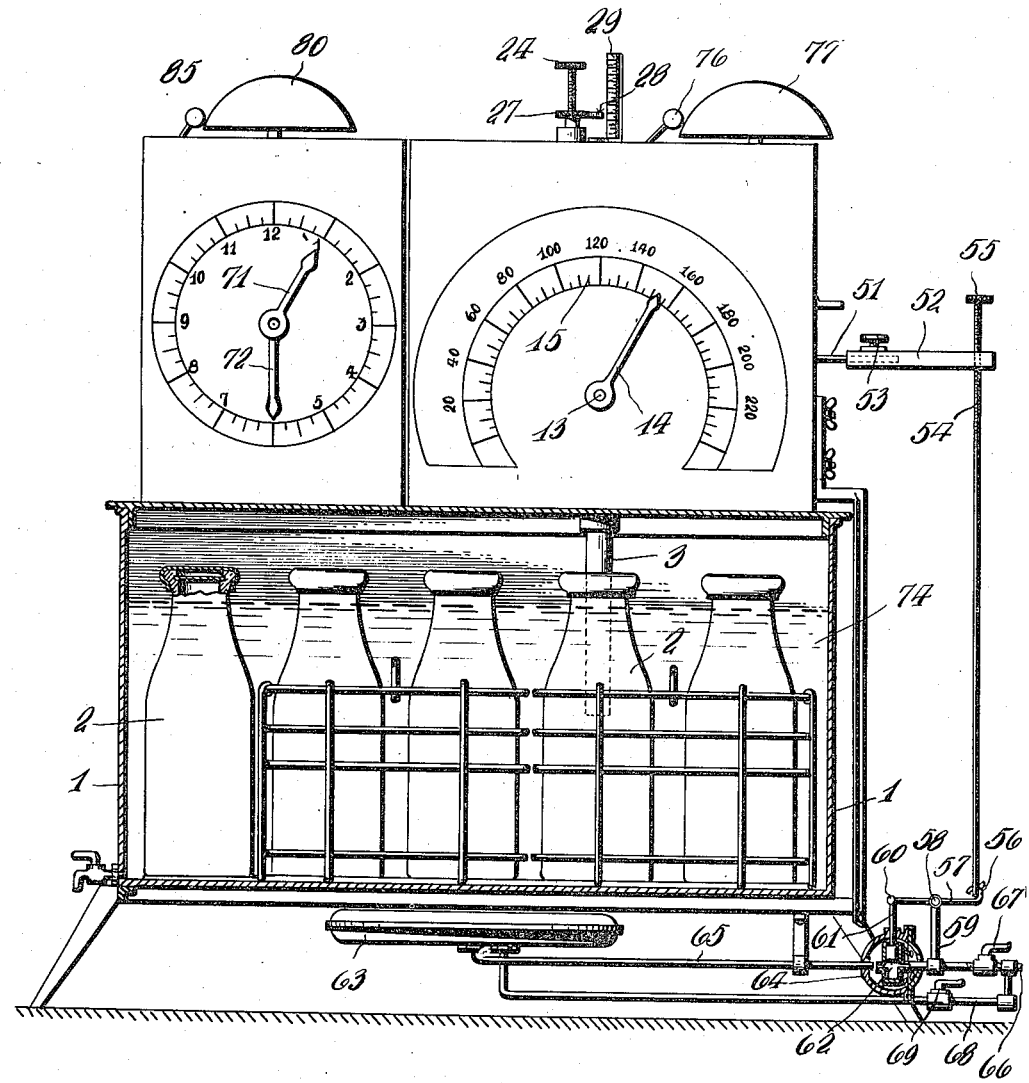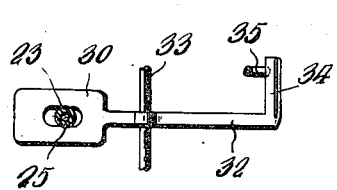

UNITED STATES PATENT OFFICE.

PHILIP MALCAMP, OF NEW ORLEANS, LOUISIANA.

AUTOMATIC ALARM MECHANISM FOR PASTEURIZING MILK.

1,421,517.   Specification of Letters Patent.   Patented July 4, 1922.

Application filed January 9, 1922. Serial No. 528,121.

*To all whom it may concern:*

Be it known that I, PHILIP MALCAMP, a citizen of France, residing at New Orleans, in the parish of Orleans and State of Louisiana, have invented certain new and useful Improvements in Automatic Alarm Mechanism for Pasteurizing Milk; and I do hereby declare the following to be a full, clear, and exact description of the invention, such as will enable others skilled in the art to which it appertains to make and use the same.

This invention relates to improvements in means for pasteurizing milk and other food products, and has for its object to provide a mechanism which will be comparatively inexpensive to manufacture, simple in operation, and more efficient in use than those heretofore proposed.

With these and other objects in view, the invention consists in the novel details of construction and combinations of parts more fully hereinafter disclosed and particularly pointed out in the claims.

In order that the precise invention may be the more clearly understood, it is said: One of the main objects of the invention is to provide a mechanism that will notify the operator when the heating of the milk reaches a predetermined temperature before boiling takes place. Another object is to provide a means by which the supply of fuel will be reduced and the milk held at a predetermined temperature for a predetermined period, say thirty minutes, during the process of pasteurization.

A still further object is to provide an alarm or signal after this said period of thirty minutes has elapsed, so as to notify the operator that the milk pasteurization has been completed and that the milk is ready for cooling off preparatory to being used.

It is intended to carry out the pasteurization of the milk in strict accordance with the directions of the various bulletins issued by the U. S. Department of Agriculture, and especially those known as Farmers' Bulletins, Numbers 42 and 143.

Referring to the accompanying drawings forming a part of this specification, in which like numerals designate like parts in all the views:

Figure 1 is a diagrammatic partially sectional view of an apparatus made in accordance with this invention;

Figure 2 is a diagrammatic sectional view of a portion of the apparatus as seen from the side opposite to that shown in Figure 1;

Figure 3 is a sectional view taken on the line 3—3 of Figure 2, looking in the direction of the arrows;

Figure 4 is a diagrammatic sectional view of a portion of the parts shown in Figure 2; and Figure 5 is a detail view taken on the line 5—5 of Figure 4, looking in the direction of the arrows.

1 indicates any suitable container in which is located milk bottles 2, containing the material to be pasteurized. 3 is a closed tube containing any suitable expansible fluid, which tube is adapted to enter the bottles 2 and which tube terminates in the curved bourdon, or thermostatic element 4, whose extreme end 5 is adapted to raise and lower upon changes of temperature in the bottle 2. Attached to said end 5 as by the pins 6, is the link 7 which is attached as by the pin 8 to the lever 9, pivoted as at 10 to the frame of the mechanism. Said lever 9 carries the curved rack 11 meshing with the pinion 12 rigid with the shaft 13 which carries the pointer 14, see Figure 1, moving over the scale 15, all as will be clear from Figures 1, 2 and 4 of the drawings.

The extreme end 5 of the Bourdon element 4 is also provided with an extension 16 provided with the roller 17, over which passes the lever 18 pivoted as at 19 and carrying a weight 20, as best shown in Figure 4. The left hand end of the lever 18 rests as at the point 21, on a curved portion of the Bourdon tube 4 and contacting with said lever as at the point 22, is the lower end of the screw member 23 provided with the knurled head 24. This said screw member fits in a tube 25, provided with the lower disk 26 and an upper disk 27. Said upper disk 27 is provided with the pointer 28 adapted to move over the scale 29, secured to the frame 30' of the mechanism. Said tube 25 passes through one end 30 of the lever 32, pivoted as at 33 and having a bent portion 34 adapted to contact with the bent end 35 of the member 36 connected with and adapted to rock the shaft 45, see Figure 3, carrying the anchor detent 46 controlling the alarm mechanism 38 of a clock train provided with the pinion 39 meshing with the rack 40 carried by the longitudinally reciprocating member 41 guided as at 42 and provided with the depending lug or toe 43, all as will be clear from Figure 2 of the drawings.

At the right hand end of the reciprocating member 41 as seen in Figure 2, there is located a detent 44 adapted to strike the pinion 45' mounted on the shaft 46', and to turn said pinion. When said member 41 is moved toward the left as seen in Figure 2, its depending toe 43 will catch between the teeth of said pinion 45' and prevent the same from turning. 45² indicates a weight mounted on the lever 49 pivoted as at 50 and provided with the bent portion 51 to which is adjustably attached the connection 52, controlled by the screw 53 and which connection 52 supports the screw rod 54 having the knurled head 55, and which extends downwardly to a point near the bottom of the container 1, as best shown in Figure 1. The bottom end of the said rod 54 is joined as at 56 to one end of the lever 57 pivoted as at 58 to the support 59 and joined at its other end 60 with the vertical moving pin 61 adapted to move up and down, and to regulate the supply of gas passing through the valve 62. 63 represents a gas burner of any suitable design which is supplied with a mixture of air and gas from the member 64 through the pipe 65. 66 represents a gas supply, 67 a cock controlling the flow of gas to the mixer 64, and 68 represents a pipe to supply a pilot flame to the burner 63, which pipe is controlled by the cock 69.

The operation of this invention is as follows:

The alarm mechanism shown on the left of Figure 2 being wound as by turning the key 70, see Figure 3, and the alarm clock being set to indicate the time at which the alarm is to go off as by turning the hands 71 and 72 on the clock face, see Figure 1, the plate or disk 27 is adjusted so that its pointer 28 indicates the number of degrees on the scale 29 at which the milk is to be pasteurized. The burner 63 is now lighted, which will heat up the water 74 carried in the container 1, and will thus heat up the contents of the bottles 2. The thermostatic element 3 being inserted in one of the bottles, its fluid will expand as the water 74 heats up and the expansion of the fluid in the element 3 will cause the end 5 of the thermostatic element 4 to rise. The rising of this end 5 will turn the shaft 13 and the pointer 14 over the scale 15, see Figure 1, which will indicate the temperature at any given instant to which the milk in the bottles 2 has been heated. Also the rising of the end 5 of the Bourdon tube 4 will raise the lower end of the rod 23, which will likewise raise the lower disk 26 and the end 30 of the lever 32, which will depress the bent end 34 of said lever 32. The depression of said end 34 will be sufficient when the desired temperature of, say, 145° has been reached, to set off the alarm train 38 and to cause the bell clapper 76 to strike the bell 77. The striking of the bell 77 will indicate to the operator that the desired pasteurization temperature of 145° has been reached, and the setting off the alarm train 38 will cause the pinion 39 to continuously turn, which will move the reciprocating member 41 toward the right, as seen in Figure 2. The movement of this said member 41 will cause its detent 44 to contact with the pinion 45 and to turn said pinion. In the meantime, the rising of the disk 26 and end 30 of the lever 32 causes the portion 51 of the lever 49 to rise by reason of the contact of the ends 30 with said bent portion 51, as plainly shown in Figures 2 and 4. The bent end 51 of said lever 49 being thus raised, the screw rod 54 is raised, which, as plainly shown in Figure 1, will depress the controlling pin 61 of the mixer 64, and thus will the fuel supply to the pipe 65 and burner 63 be reduced. The reduction of the fuel supply will tend to lower the temperature of the water 74 and the milk in the bottles 2. Should the temperature of these liquids be thus lowered, then will the disk 26 fall, owing to the fall of the end 5 of the Bourdon tube, and the falling of said disk 26 and end 30 of the lever 32 permit the falling of the bent portion 51 and rod 54. The falling of the rod 54 will raise the pin 61 and thus admit more fuel to the burner 63, with the result that the temperature of the fluid in the milk bottles 2 will be raised. Thus will the temperature of the milk bottles be maintained at a substantially constant degree, while the pinion 39 continues to turn, and the time of turning of this said pinion will be regulated by the alarm mechanism through the setting of the hands 71 and 72 in the usual manner.

Suppose this period is thirty minutes. Such a period will enable the milk to be held at a constant temperature of, say, 145° for thirty minutes, and thus will the operator know that the period of pasteurization has been completed. At the end of this thirty minute period, the detent 44 on the reciprocating member 41 will have been pushed against the teeth of the pinion 45', which controls the second alarm clock mechanism not shown. That is to say, the pushing or turning of this said pinion 45' will cause, by mechanism not shown, the turning of the arm or lug 81 which raises the lever 82 pivoted as at 83, and depresses its bent end 84 which sets off the alarm, and causes the bell clapper 85 to strike the bell 80. Thus is the operator notified that the period of thirty minutes has been completed and that the milk is ready for cooling off prior to use.

When the second alarm 80 is wound up and not in use, the toe 43 by engaging the pinion 45 prevents said alarm from running down in the manner well known.

It is obvious that those skilled in the art may vary the details of construction, as well as the arrangement of parts without departing from the spirit of the invention, and therefore I do not wish to be limited to the above disclosure except as may be required by the claims.

What I claim is:

1. In a pasteurizing apparatus, the combination of a liquid container in which the material to be pasteurized is placed; means for heating said container comprising a fuel supply; an expansible and contractible thermostatic element adapted to be moved by changes in temperature of the material being treated; an alarm mechanism controlled by the movements of said thermostatic element; means to regulate said fuel supply controlled by said thermostatic element; and a second alarm mechanism adapted to be set off from said first named alarm mechanism, substantially as described.

2. In a pasteurizing apparatus, the combination of a liquid container in which the material to be pasteurized is placed; means for heating said container comprising a fuel supply; an expansible and contractible thermostatic element comprising a Bourdon tube adapted to be moved by changes in temperature of the material being treated; a scale of temperatures; an indicator; connections between said Bourdon tube and said indicator by which the latter is moved over said scale; an alarm mechanism controlled by the movements of said thermostatic element; means to regulate said fuel supply controlled by said thermostatic element; and a second alarm mechanism adapted to be set off from said first named alarm mechanism, substantially as described.

3. In a pasteurizing apparatus the combination of a liquid container in which the material to be pasteurized is placed; means for heating said container comprising a fuel supply; an expansible and contractible thermostatic element adapted to be moved by changes in temperature of the material being treated; an alarm mechanism comprising a pinion controlled by the movements of said thermostatic element; means to regulate said fuel supply controlled by said thermostatic element; a movable member operated by said pinion; and a second alarm mechanism adapted to be set off by said movable member when operated by said pinion from said first named alarm mechanism, substantially as described.

4. In an apparatus for pasteurizing milk, the combination of a container adapted to hold water in which milk bottles may be placed; means for heating said water comprising a gas supply; an expansible element adapted to be moved by a rise of temperature in said milk; a temperature scale; means operated by said expansible element for moving an indicator over said scale; an alarm mechanism comprising a pinion; connections operated by said expansible element and last named means for setting off said alarm mechanism when a predetermined temperature has been reached; a second alarm mechanism; connections between said pinion and said second alarm mechanism for setting off the latter; and connections between said fuel supply and said expansible element for cutting off said supply when said first named alarm mechanism is started, substantially as described.

5. In an apparatus for pasteurizing milk the combination of a container adapted to hold water in which milk bottles may be placed; means for heating said water comprising a gas supply; an expansible element adapted to enter one of said milk bottles and to be moved by a rise of temperature in said milk; a temperature scale; means operated by said expansible element for moving an indicator over said scale; an alarm mechanism provided with hour and minute hands and comprising a pinion; connections operated by said expansible element and last named means for setting off said alarm mechanism when a predetermined temperature has been reached; a second alarm mechanism; connections comprising a slidable reciprocating member between said pinion and said second alarm mechanism for setting off the latter; and connection between said fuel supply and said expansible element for cutting off said supply when said first named alarm mechanism is started, substantially as described.

6. In an apparatus for pasteurizing milk, the combination of an expansible element adapted to be moved by changes of temperature in said milk; an alarm mechanism adapted to be set off by said expansible element when a predetermined temperature in said milk has been reached; means for heating said milk; means for governing said heating means controlled by said expansible element; a second alarm mechanism; and means operated by said first named alarm mechanism for setting off said second alarm mechanism after said first alarm mechanism has sounded, substantially as described.

In testimony whereof I affix my signature

PHILIP MALCAMP.